(12) United States Patent
Yan

(10) Patent No.: US 12,308,442 B1
(45) Date of Patent: May 20, 2025

(54) CONDUCTIVE CARBON PAPER AND PREPARATION METHOD AND USE THEREOF

(71) Applicant: CAS Linkfiber New Materials (Changzhou) Co., LTD, Changzhou (CN)

(72) Inventor: Pan Yan, Changzhou (CN)

(73) Assignee: CAS Linkfiber New Materials (Changzhou) Co., LTD, Changzhou (CN)

( * ) Notice: Subject to any disclaimer, the term of this patent is extended or adjusted under 35 U.S.C. 154(b) by 0 days.

(21) Appl. No.: 19/004,327

(22) Filed: Dec. 29, 2024

(30) Foreign Application Priority Data

May 9, 2024 (CN) .......................... 202410569800.9

(51) Int. Cl.
| | |
|---|---|
| *H01M 4/88* | (2006.01) |
| *D21H 13/50* | (2006.01) |
| *D21H 19/12* | (2006.01) |
| *D21H 23/42* | (2006.01) |
| *D21H 25/00* | (2006.01) |
| *D21H 25/06* | (2006.01) |

(52) U.S. Cl.
CPC .......... *H01M 4/8807* (2013.01); *D21H 13/50* (2013.01); *D21H 19/12* (2013.01); *D21H 23/42* (2013.01); *D21H 25/005* (2013.01); *D21H 25/06* (2013.01)

(58) Field of Classification Search
CPC .................................................. H01M 4/8807
See application file for complete search history.

(56) References Cited

FOREIGN PATENT DOCUMENTS

| | | | | |
|---|---|---|---|---|
| CN | 111549573 A | 8/2020 | | |
| CN | 118588962 A | 9/2024 | | |
| JP | 2004185911 A | * 7/2004 | .......... | H01M 4/8807 |

* cited by examiner

*Primary Examiner* — Brian R Ohara
(74) *Attorney, Agent, or Firm* — Nitin Kaushik

(57) ABSTRACT

The present disclosure provides a conductive carbon paper and a preparation method and use thereof, which fall within the technical field of fuel cells. The conductive carbon paper includes a carbon fiber and a binder component, wherein the binder component contains an elastic aid; when a load of 1 MPa is applied in the thickness direction of the carbon paper, the bulk density thereof is 0.30-0.40 g/cm$^3$. The preparation method of the conductive carbon paper is: preparing a carbon fiber base paper including the elastic aid, placing the same in a glue solution for impregnation, and then drying, curing, and carbonizing to obtain. The conductive carbon paper is used for a fuel cell to solve the technical problem that the electrical resistivity of the carbon paper is high when compressed and it is difficult to recover after compression.

10 Claims, No Drawings

CONDUCTIVE CARBON PAPER AND PREPARATION METHOD AND USE THEREOF

TECHNICAL FIELD

The present disclosure is in the technical field of fuel cells, and more particularly relates to a conductive carbon paper and a preparation method and use thereof.

BACKGROUND

Generally, the basic structure of a solid polymer fuel cell (hereinafter referred to as a fuel cell) is composed of a proton exchange membrane, a catalyst, and a gas diffusion layer disposed on both sides of a cathode and an anode. The gas diffusion substrate functions as a cell reaction field and a current collector. In addition, in a general fuel cell, a water-repellent layer is disposed between the catalyst and the gas diffusion layer substrate, and a bipolar plate is disposed on the other side of the gas diffusion layer substrate.

In the prior art, a gas diffusion layer substrate carbon paper for a fuel cell is a porous sheet material formed by bonding dispersed carbon fibers with a carbide, and carbon paper having different porosities can be designed to improve the air permeability and water drainage of the carbon paper.

However, the density, strength, and thermal conductivity of porous carbon paper are currently uncompressed values, and in fact, when such porous carbon paper is disposed as a gas diffusion substrate in a fuel cell, the porous carbon sheet will be compressed. When compressed, carbon fibers and carbide do not have elasticity, which will cause deformation of carbon paper during long-term compression, resulting in gas leakage, increased resistivity, and decreased power generation performance.

In view of this, the present disclosure has been proposed.

SUMMARY

It is an object of the present disclosure to provide a conductive carbon paper and a preparation method and use thereof, which solve the above-mentioned problems.

In order to achieve the above object, the present disclosure adopts the following technical solutions:

In a first aspect, the present disclosure provides a conductive carbon paper, including a carbon fiber and a binder component, wherein the binder component contains an elastic aid; when a load of 1 MPa is applied in the thickness direction of the carbon paper, the bulk density of the carbon paper is 0.30-0.40 $g/cm^3$.

In a second aspect, the present disclosure also provides a preparation method for the conductive carbon paper, including the following steps:
- S1: preparing a carbon fiber base paper including the elastic aid;
- S2: placing the carbon fiber base paper in a glue solution for impregnation;
- S3: drying, curing, and carbonizing the impregnated carbon fiber base paper; and
- S4: subjecting the carbonized product to hydrophobization to obtain.

In a third aspect, the present disclosure also provides the use of conductive carbon paper in the field of fuel cells.

Advantageous Effects of the Present Disclosure the present disclosure can sufficiently increase the total area of the carbon material exposed on the surface of the carbon paper by adding an elastic aid when preparing the conductive carbon paper, on the one hand, with a considerable elastic restoring force, and on the other hand, when the carbon paper is compressed, so that the resistivity in the thickness direction decreases. Meanwhile, gas permeability and gas diffusibility are high even when compressed for a long period of time. The technical problem of high resistivity of carbon paper when compressed and difficult recovery after compression is solved, so that the membrane electrode of the fuel cell maintains long-term conductive stability during power generation.

DETAILED DESCRIPTION OF THE EMBODIMENTS

In order that the objects, aspects, and advantages of embodiments of the present disclosure will become more apparent, a more complete description of embodiments of the present disclosure will be rendered by reference to specific embodiments thereof, which are illustrated in the appended claims. Based on the embodiments of the present disclosure, all other embodiments obtained by a person of ordinary skill in the art without inventive effort fall within the scope of the present disclosure.

When an equivalent, concentration or other value or parameter is expressed as a range, preferred range, or range bounded by a series of upper preferable values and lower preferable values, this is to be understood as specifically disclosing all ranges formed from any pair of any upper range limit or preferred value and any lower range limit or preferred value, regardless of whether ranges are separately disclosed. For example, when a range of "1 to 5" is disclosed, the recited range should be interpreted to include the ranges "1 to 4", "1 to 3", "1 to 2", "1 to 2 and 4 to 5", "1 to 3 and 5", etc. Where a range of numerical values is recited herein, unless otherwise stated, the range is intended to include the endpoints thereof and all integers and fractions within the range.

In these examples, the parts and percentages are by mass unless otherwise indicated. All ratios of raw materials not specified in the present disclosure can be mixed in any ratio.

"and/or" is used to indicate that one or both of the stated cases may occur, e.g. A and/or B includes (A and B) and (A or B).

A conductive carbon paper according to the present disclosure includes a carbon fiber and a binder component containing an elastic aid; when a load of 1 MPa is applied in the thickness direction of the carbon paper, the bulk density of the carbon paper is 0.30-0.40 $g/cm^3$.

When the bulk density of the carbon paper when a load of 1 MPa is applied in the thickness direction of the carbon paper is 0.30 to 0.40 $g/cm^3$, the gas permeability and gas diffusibility of the carbon fiber sheet become high.

In the case where the bulk density of the carbon fiber when a load of 1 MPa is applied in the thickness direction of the carbon paper is less than 0.30 $g/cm^3$, the total area of the carbon fiber exposed at the surface of the carbon fiber sheet becomes small when the load is applied.

Therefore, when the gas diffusion substrate is brought into contact with a member such as a bipolar plate or a catalyst layer, the contact resistance becomes large.

When the bulk density of the carbon fiber when a load of 1 MPa is applied in the thickness direction of the carbon paper exceeds 0.40 $g/cm^3$, the gas permeability of the carbon fiber sheet decreases.

The resistance value of the carbon paper is preferably 2-10 mΩ·cm² when the gas diffusion substrate of the present disclosure applies a load of 1 MPa in the thickness direction of the carbon paper.

In some embodiments, the elastic aid includes 0.2-10 wt % of modified spiral carbon nanotubes and/or modified spiral carbon fibers.

Further, in some preferred embodiments, the modified spiral carbon nanotubes have a length of 30-100 μm and a diameter of 10-20 nm;

Further, in some preferred embodiments, the modified spiral carbon fibers have a length of 50-6000 μm and a diameter of 50-10000 nm.

When the content of the modified spiral carbon nanotubes and/or modified spiral carbon fibers is 0.2-10 wt %, since the modified spiral carbon nanotubes and/or modified spiral carbon fibers have elasticity, the total area of the carbon material exposed on the surface of the carbon paper can be sufficiently increased when the carbon paper is compressed. Therefore, when the gas diffusion substrate is brought into contact with a member such as a bipolar plate or a catalyst layer, the contact resistance becomes small.

When the content of the modified spiral carbon nanotubes and/or modified spiral carbon fibers is less than 0.2 wt %, the elastic restoring force of the modified spiral carbon nanotubes and/or modified spiral carbon fibers is small, and thus the influence on the contact resistance during compression and the restoring force during long-term compression is small.

When the content of the modified spiral carbon nanotubes and/or modified spiral carbon fibers exceeds 10 wt %, the modified spiral carbon nanotubes and/or modified spiral carbon fibers exposed on the surface of the carbon fiber sheet are excessive when the carbon paper is compressed, and easily fall off, polluting the environment.

A preparation method for the conductive carbon paper of the present disclosure includes the following steps:

S1: preparing a carbon fiber base paper including the elastic aid.

In some embodiments, the carbon fiber base paper prepared is: placing the carbon fiber, the elastic aid, and the dispersant in water, dispersing uniformly to obtain a suspension, and preparing a carbon fiber base paper by a conventional paper-making method.

In some embodiments, the carbon fiber has a mass concentration of 0.05-0.5 wt %.

In some embodiments, the mass concentration of the dispersant is 0.01-1 wt %; the dispersant includes one or more of sodium polyacrylate, sodium dodecyl benzene sulfonate, polyoxyethylene amine, polyacrylamide, polyvinyl alcohol, polyethylene glycol, polyoxyethylene, carboxymethyl cellulose, hydroxyethyl cellulose or chitosan, etc.

In some embodiments, the elastic aid includes modified spiral carbon nanotubes and/or modified spiral carbon fibers.

In some preferred embodiments, the mass concentration of the elastic aid is 0.2-10 wt %.

Further, the modified spiral carbon nanotubes have a length of 30-100 μm and a diameter of 10-20 nm;

further, the modified spiral carbon fibers have a length of 50-6000 μm and a diameter of 50-10000 nm.

Further, the modified spiral carbon nanotubes or modified spiral carbon fibers are obtained by heat-treating the spiral carbon nanotubes or spiral carbon fibers at 150-400° C. in an oxygen-containing atmosphere for 1-60 min. The oxygen-containing atmosphere includes air or other oxygen-containing atmosphere.

The heat treatment in an oxygen-containing atmosphere can remove substances such as moisture and organic pollutants, and when the heat treatment temperature is less than 150° C., the required heat treatment time is tedious, increasing the production cost; when the heat treatment temperature is higher than 400° C., the spiral carbon nanotubes or spiral carbon fibers are excessively oxidized, resulting in a decrease in mechanical properties.

S2: placing the carbon fiber base paper in a glue solution for impregnation.

In some embodiments, the glue solution is a solution of a binding resin. The mass concentration of the solution of the binding resin is 0.5-30 wt %.

S3: drying, curing and carbonizing the impregnated carbon fiber base paper.

In some embodiments, the curing is pressing the dried carbon fiber base paper at 150-250° C. and 0.1-5 MPa.

In some embodiments, the temperature of the carbonizing is from 1200-2300° C. and the time of the carbonizing is from 2-30 min.

S4: subjecting the carbonized product to hydrophobization to obtain the conductive carbon paper, which can be used as a gas diffusion layer substrate for a fuel cell membrane electrode.

In some embodiments, the hydrophobization is sufficient to contact the carbonized product with a solution, dispersion or suspension of a hydrophobic material, followed by drying and thermal treatment.

In some preferred embodiments, the hydrophobic material includes a fluorine-containing resin.

In some more preferred embodiments, the hydrophobic material includes one or more of polytetrafluoroethylene (PTFE), tetrafluoroethylene-hexafluoropropylene copolymer (FEP), tetrafluoroethylene-perfluoroalkyl vinyl ether copolymer (PFA), or tetrafluoroethylene-ethylene copolymer (ETFE).

The invention also provides the use of conductive carbon paper in the field of fuel cells.

The carbide-based phase of the present disclosure, as well as the carbon fibers and elastomeric components contained in the phase, have a stable conductive path. In addition, since the gas diffusion layer substrate has elasticity due to the presence of the elastic component in the material, the dimensional absorption at the time of forming a compressive joint with the proton exchange membrane layer or the catalyst layer at the time of fuel cell production is improved, and even after a long period of compression, the electrical conductivity does not significantly decrease, thereby maintaining stable power generation performance of the cell.

The carbon paper prepared in examples of the present disclosure was tested, including the thickness direction resistivity test, the change rate of thickness direction resistivity of the carbon paper due to long-term compression, air permeability, and membrane electrode power generation performance test, etc.

Carbon paper surface morphology: the uniformity of the carbon paper was visually observed.

The resistivity test method in thickness direction: the carbon paper was clamped between two gold-plated copper electrodes, a pressure of 1 MPa was applied between the copper electrode plates, and then a current density of 10 mA/cm² was passed, and the voltage drop at this time was read, and the resistivity in the thickness direction of the carbon paper was calculated according to the following formula:

$$R(\Omega \cdot cm^2) = (\text{voltage drop}(V) \times \text{sample area}(cm^2))/\text{current}(A)$$

Change rate of resistivity in the thickness direction of carbon paper caused by long-term compression: the carbon paper was placed between two gold-plated copper electrodes and the resistivity in the thickness direction at a surface pressure of 1.0 MPa was measured after 5 min; further, a surface pressure of 1.0 MPa was continuously applied for 14,400 min, and the resistivity in the thickness direction after the continuous pressure application was measured. The change rate of resistivity in the thickness direction due to long-term compression is calculated as follows:

Thickness Direction Resistivity Change Rate (%) Caused by Long-Term Compression $$=[\text{Resistivity in thickness direction when pressed for 5 min}(\Omega \cdot cm^2) - \text{Resistivity in thickness direction when pressed for 14,400 min}(\Omega \cdot cm^2)]/\text{Resistivity in thickness direction when pressed for 5 min}(\Omega \cdot cm^2)$$

Test method for air permeability: the carbon paper was clamped with a special tool, and mounted on the air permeability tester; air permeability (mL/hr/cm$^2$/mmAq) was then calculated by passing 200 mL of air in the thickness direction of the carbon paper.

Test for power generation performance of membrane electrode: the single cell was tested by a fuel cell test station (Changsha Blue Membrane Technology Co. Ltd.). Under different humidity conditions, the attenuation of membrane electrode performance, i.e. current density-voltage polarization curve and power density curve, was obtained through the corresponding current attenuation after single cell discharge under constant voltage.

The test steps are as follows: the operating temperature of the fuel cell was fixed at 80° C. and 20% relative humidity (RH), and 200 mL/min was used to supply humidified pure hydrogen and pure oxygen to the anode and cathode, respectively. A back pressure of 55 kPa was applied at the exhaust ports on both sides. Prior to cell testing, the membrane electrode was first subjected to an activation treatment of 30 min under fully humidified conditions (100% RH) using a constant voltage of 0.6 V until the current density of the cell reached a steady state. Polarization curves were measured at 20 mVs-1 per step using a scan voltage of 1.0 V to 0.2 V.

From the obtained polarization curve, the power generation performance can be evaluated as follows:
- when the current density is ≥2.5 A/cm$^2$@0.6V, it is counted as good, which is represented by the symbol ⊚;
- when the current density is ≥1.5 A/cm$^2$@0.6V and the current density is <2.5 A/cm$^2$@0.6V, it is considered acceptable, which is represented by the symbol Δ;
- when the current density is <1.5 A/cm$^2$@0.6V, it is counted as a difference, which is represented by the symbol λ.

Example 1

According to the preparation method provided in the present disclosure, a conductive carbon paper is prepared and the properties thereof are tested, and the specific steps are as follows:

(1) Commercially available spiral carbon nanotubes were heat-treated at 180° C. under air for 20 min to obtain modified spiral carbon nanotubes having a length of 30-100 μm and a diameter of 10-20 nm.

(2) About 1 g of carbon fiber, 10 g of the modified spiral carbon nanotubes obtained in step (1) and 1 g of polyvinyl alcohol were placed in 1000 mL of deionized water and dispersed uniformly to obtain a suspension, and a carbon fiber base paper was prepared by a conventional paper-making method.

(3) An aqueous solution of about 10 wt % phenolic resin was prepared to form a glue solution.

(4) Impregnating the carbon fiber base paper obtained in step (2) with 30 min in the glue solution of step (3).

(5) The carbon fiber base paper obtained in step (4) was dried at 120° C., followed by being pressed at 200° C. and 0.5 MPa for 10 min, and carbonized at 2000° C. for 20 min.

(6) The carbonized product was immersed in an aqueous solution of PTFE having a mass concentration of 10% for 5 min, taken out and dried, and further sintered at 350° C. to obtain the conductive carbon paper. The conductive carbon paper included about 1 wt % of modified spiral carbon nanotubes and had a bulk density of 0.33 g/cm$^3$ when a load of 1 MPa was applied in the thickness direction of the carbon paper.

Two pieces of the conductive carbon paper were symmetrically placed on both sides of the catalyst-coated proton exchange membrane, wherein the catalyst coating amount on both sides was 0.5 mg/cm$^2$, and hot-pressed at 170° C. to form a membrane electrode.

A single cell was assembled by sandwiching the membrane electrode between two graphite bipolar plates with a single serpentine flow channel with polytetrafluoroethylene as a sealing gasket.

Finally, the power generation performance was evaluated according to the test method of the membrane electrode described above.

The performance test data of the conductive carbon paper and membrane electrode are shown in Table 1.

Example 2

According to the preparation method provided in the present disclosure, a conductive carbon paper is prepared and the properties thereof are tested, and the specific steps are as follows:

(1) Commercially available spiral carbon nanotubes were heat-treated at 200° C. under air for 20 min to obtain modified spiral carbon nanotubes having a length of 30-100 μm and a diameter of 10-20 nm.

(2) About 3 g of carbon fiber, 5 g of the modified spiral carbon nanotubes obtained in step (1) and 3 g of polyacrylamide were placed in 1000 mL of deionized water, dispersed uniformly to obtain a suspension, and a carbon fiber base paper was prepared by a conventional paper-making method.

(3) An aqueous solution of about 20 wt % phenolic resin was prepared to form a glue solution.

(4) Impregnating the carbon fiber base paper obtained in step (2) with 30 min in the glue solution of step (3).

(5) The carbon fiber base paper obtained in step (4) was dried at 120° C., followed by pressed at 150° C. and 1 MPa for 10 min, and carbonized at 1800° C. for 20 min.

(6) The carbonized product was immersed in an aqueous solution of PFA having a mass concentration of 8% for 5 min, taken out and dried, and further sintered at 350° C. to obtain the conductive carbon paper. The conductive carbon paper included about 0.5 wt % of modified spiral carbon nanotubes and had a bulk density of 0.30 g/cm$^3$ when a load of 1 MPa was applied in the thickness direction of the carbon paper.

Two pieces of the conductive carbon paper were symmetrically placed on both sides of the catalyst-coated proton exchange membrane, wherein the catalyst coating amount on both sides was 0.5 mg/cm², and hot-pressed at 170° C. to form a membrane electrode.

A single cell was assembled by sandwiching the membrane electrode between two graphite bipolar plates with a single serpentine flow channel with polytetrafluoroethylene as a sealing gasket.

Finally, the power generation performance was evaluated according to the test method of the membrane electrode described above.

The performance test data of the conductive carbon paper and membrane electrode are shown in Table 1.

Example 3

According to the preparation method provided in the present disclosure, a conductive carbon paper is prepared and the properties thereof are tested, and the specific steps are as follows:

(1) A commercially available spiral carbon fibers were heat-treated at 150° C. for 20 min in the air to obtain a modified spiral carbon fiber having a length of 50-6000 μm and a diameter of 50-10000 nm.

(2) About 1 g of carbon fiber, 50 g of the modified spiral carbon fibers obtained in step (1) and 0.5 g of polyvinyl alcohol were placed in 1000 mL of deionized water and dispersed uniformly to obtain a suspension, and a carbon fiber base paper was prepared by a conventional papermaking method.

(3) A solution of about 1 wt % phenolic resin in methanol was prepared to form a glue solution.

(4) Impregnating the carbon fiber base paper obtained in step (2) with 60 min in the glue solution of step (3).

(5) The carbon fiber base paper obtained in step (4) was dried at 120° C., followed by pressed at 200° C. and 3 MPa for 10 min, and carbonized at 1500° C. for 20 min.

(6) The obtained carbon paper was immersed in an aqueous solution of FEP having a mass concentration of 12% for 5 min, taken out and dried, and further sintered at 350° C. to obtain the conductive carbon paper. The conductive carbon paper included about 5 wt % of modified spiral carbon fibers, and had a bulk density of 0.34 g/cm³ when a load of 1 MPa was applied in the thickness direction of the carbon paper.

Two pieces of the conductive carbon paper were symmetrically placed on both sides of the catalyst-coated proton exchange membrane, wherein the catalyst coating amount on both sides was 0.5 mg/cm², and hot-pressed at 170° C. to form a membrane electrode.

A single cell was assembled by sandwiching the membrane electrode between two graphite bipolar plates with a single serpentine flow channel with polytetrafluoroethylene as a sealing gasket.

Finally, the power generation performance was evaluated according to the test method of the membrane electrode described above.

The performance test data of the conductive carbon paper and membrane electrode are shown in Table 1.

Comparative Example 1

The difference from Example 1 is that the carbon fiber base paper was prepared without modified spiral carbon nanotubes, and the performance test data of the obtained conductive carbon paper and membrane electrode are shown in Table 1.

Comparative Example 2

The difference from Example 1 is that the addition amount of the modified spiral carbon nanotubes in step (2) is 1 g, the content of the modified spiral carbon nanotubes in the obtained conductive carbon paper is about 0.1 wt %, and the performance test data of the obtained conductive carbon paper and membrane electrode are shown in Table 1.

Comparative Example 3

The difference from Example 1 is that the addition amount of the modified spiral carbon nanotubes in step (2) is 150 g, the content of the modified spiral carbon nanotubes in the obtained conductive carbon paper is about 15 wt %, and the performance test data of the obtained conductive carbon paper and membrane electrode are shown in Table 1.

Comparative Example 4

The difference from Example 1 is that commercially available spiral carbon nanotubes having a length of 30-100 μm and a diameter of 10-20 nm without modification are directly used in step (2). The performance test data of the obtained conductive carbon paper and membrane electrode are shown in Table 1.

Table 1 Performance test of conductive carbon paper obtained in examples and comparative examples

| | Thickness direction resistivity | Change rate of resistivity in thickness | Air Permeability (mL/hr/cm²/mmAq) | Power generation performance of membrane electrode | Apparent morphology |
|---|---|---|---|---|---|
| Example 1 | 5.4 | 5.2 | 1850 | ☺ | Relatively |
| Example 2 | 6.7 | 7.4 | 1910 | ☺ | Relatively |
| Example 3 | 3.2 | 5.4 | 1932 | ☺ | Relatively |
| Comparative Example 1 | 7.7 | 25.8 | 1870 | X | Relatively uniform |
| Comparative Example 2 | 6.2 | 15.3 | 1855 | Δ | Relatively uniform |
| Comparative Example 3 | 3.5 | 5.1 | 1940 | Δ | obvious carbon particle shedding |
| Comparative Example 4 | 7.2 | 7.4 | 1901 | X | Relatively uniform |

It can be seen from Table 1 that the electrical resistivity of Examples 1-3 is relatively low, and the power generation performance of the membrane electrode is good and stable; although the electrical resistivity of Comparative Example 3 is also relatively low since the addition amount of the modified spiral carbon nanotubes is too high when the carbon paper is compressed, the surface of the carbon fiber sheet is exposed too many modified spiral carbon nanotubes, and there is obvious carbon particle shedding. The modified spiral carbon nanotubes of Comparative Example 2 were added at too low an amount, resulting in a significant increase in resistivity deviation under continuous pressurization. Comparative Example 1 using no modified spiral carbon nanotubes and Comparative Example 4 using unmodified spiral carbon nanotubes were inferior in resistivity, conductivity stability, and power generation performance of the membrane electrode.

It should be noted that each of the technical features of the above-mentioned embodiments can be combined in any combination, and in order to make the description concise, not all the possible combinations of each of the technical features of the above-mentioned embodiments are described; however, as long as there are no these technical features, they should be considered as the scope of the description. The above examples are indicative of only a few embodiments of the present application, which are described in more detail and detail, but are not to be construed as limiting the scope of the present disclosure. It should be noted that a person skilled in the art could also make several changes and modifications without departing from the concept of the present application, which falls within the scope of the present application. Accordingly, the protection sought herein is as set forth in the claims below.

What is claimed is:

1. A conductive carbon paper, comprising a carbon fiber and a binder component, wherein the binder component contains an elastic aid;
   when a load of 1 MPa is applied in the thickness direction of the carbon paper, the bulk density of the carbon paper is 0.30-0.40 g/cm$^3$;
   the elastic aid comprises 0.2-10 wt % of modified spiral carbon nanotubes and/or modified spiral carbon fibers;
   the modified spiral carbon nanotubes or modified spiral carbon fibers are obtained by heat-treating the spiral carbon nanotubes or spiral carbon fibers at 150-400° C. in an oxygen-containing atmosphere.

2. The conductive carbon paper according to claim 1, wherein the modified spiral carbon nanotubes have a length of 30-100 μm and a diameter of 10-20 nm.

3. The conductive carbon paper according to claim 1, wherein the modified spiral carbon fibers have a length of 50-6000 μm and a diameter of 50-10000 nm.

4. A preparation method for the conductive carbon paper according to claim 1, comprising the following steps:
   S1: preparing a carbon fiber base paper comprising the elastic aid;
   S2: placing the carbon fiber base paper in a glue solution for impregnation;
   S3: drying, curing, and carbonizing the impregnated carbon fiber base paper;
   S4: subjecting the carbonized product to hydrophobization to obtain;
   wherein in step S1, the carbon fiber base paper is prepared as follows: placing the carbon fiber, the elastic aid, and the dispersant in water, dispersing uniformly to obtain a suspension, and preparing a carbon fiber base paper by a conventional paper-making method;
   the mass concentration of the carbon fiber is 0.05-0.5 wt %;
   the mass concentration of the dispersant is 0.01-1 wt %;
   the elastic aid comprises modified spiral carbon nanotubes and/or modified spiral carbon fibers;
   the mass concentration of the elastic aid is 0.2-10 wt %;
   the modified spiral carbon nanotubes or modified spiral carbon fibers are obtained by heat-treating the spiral carbon nanotubes or spiral carbon fibers at 150-400° C. in an oxygen-containing atmosphere.

5. The preparation method according to claim 4, wherein in step S2, the glue solution is a solution of a binding resin;
   the mass concentration of the solution of the binding resin is 0.5-30 wt %.

6. The preparation method according to claim 5, wherein in the step S2, the mass concentration of the solution of the binding resin is 0.5-20 wt %.

7. The preparation method according to claim 4, wherein in the step S3, the curing is performed by pressing the dried carbon fiber base paper at 150-250° C. and 0.1-5 MPa;
   the temperature of the carbonizing is 1200-2300° C. and the time of the carbonizing is 2-30 min.

8. The preparation method according to claim 4, wherein in the step S4, the hydrophobization is performed to sufficiently contact the carbonized product with a solution or dispersion of a hydrophobic material, followed by drying and heat treatment.

9. The preparation method according to claim 8, wherein in the step S4, the hydrophobic material comprises a fluorine-containing resin.

10. The preparation method according to claim 9, wherein in the step S4, the hydrophobic material comprises one or more of polytetrafluoroethylene, tetrafluoroethylene-hexafluoropropylene copolymer, tetrafluoroethylene-perfluoroalkyl vinyl ether copolymer, or tetrafluoroethylene-ethylene copolymer.

* * * * *